United States Patent [19]
Bouzat et al.

[11] Patent Number: 5,961,812
[45] Date of Patent: Oct. 5, 1999

[54] PROCESS AND GASEOUS EFFLUENT-COLLECTION DEVICE FOR CHANGING SPENT ANODES OF POTS FOR ELECTROLYSIS OF ALUMINUM

[75] Inventors: Gilbert Bouzat, Bollene; Pierre Personnet, Saint Jean de Maurienne, both of France

[73] Assignee: Aluminium Pechiney, Courbevoie, France

[21] Appl. No.: 08/955,699

[22] Filed: Oct. 23, 1997

[30] Foreign Application Priority Data

Oct. 23, 1996 [FR] France .................................. 96 13145

[51] Int. Cl.$^6$ ................................ C25C 3/22; C21B 7/22
[52] U.S. Cl. ........................ 205/391; 205/392; 204/245; 204/247; 204/279; 266/157; 75/10.27
[58] Field of Search .................................. 205/391, 392, 205/394, 393; 204/245, 247, 279; 266/157; 75/10.27

[56] References Cited

U.S. PATENT DOCUMENTS

| | | | |
|---|---|---|---|
| 3,664,935 | 5/1972 | Johnson | 205/393 |
| 4,053,384 | 10/1977 | Siegmund | 204/245 X |
| 4,668,352 | 5/1987 | Duprat et al. | 205/391 X |
| 4,855,031 | 8/1989 | Zannini | 204/245 X |
| 5,435,897 | 7/1995 | Zannini | 204/245 |
| 5,787,108 | 7/1998 | Pavlicevic et al. | 266/157 X |

*Primary Examiner*—Donald R. Valentine
*Attorney, Agent, or Firm*—Oblon, Spivak, McClelland, Maier & Neustadt, P.C.

[57] ABSTRACT

A process for changing spent anodes while recovering the majority of the gaseous compounds evolved by the spent anodes and by the bath crust removed from the electrolytic pots during the cooling phase uses an effluent-collection device for electrolytic pots. A device for collecting gaseous effluents from pots for the production of aluminum by igneous electrolysis allows the recovery of the gaseous compounds evolved by the spent anodes and by the crust which they contain during the replacement and cooling of these anodes and this crust. The device preferably includes a degassing and cooling container located at one of the ends of the hooding device of the pots. The container can be made to communicate with the suction produced by the gas collection device.

24 Claims, 2 Drawing Sheets

PROCESS AND GASEOUS EFFLUENT-COLLECTION DEVICE FOR CHANGING SPENT ANODES OF POTS FOR ELECTROLYSIS OF ALUMINUM

BACKGROUND OF THE INVENTION

1. Field of the Invention

The present invention relates to the control of gaseous effluents produced by processes for the production of aluminum by igneous electrolysis. It relates more particularly to the collection of toxic gaseous compounds, in particular fluoride compounds, liberated by spent anodes and by the bath crust after they have been removed from the electrolytic pots.

2. Discussion of the Background

Metallic aluminum is produced industrially by igneous electrolysis, that is by the electrolysis of alumina in a bath of molten cryolite by the well-known Hall-Héroult process. However, the electrolysis reaction, the secondary reactions and the high operating temperatures lead to the production of gaseous effluents which mainly contain carbon monoxide and dioxide and fluoride compounds.

The emission of these effluents into the atmosphere is strictly controlled and regulated not only with regard to the electrolysis room environment to safeguard the personnel working in the vicinity of the pots but also with regard to atmospheric pollution. Pollution regulations in many countries impose limits on the quantities of effluents emitted into the atmosphere.

There are present solutions which allow these effluents to be extracted, recovered and treated reliably and satisfactorily. A widely adopted solution involves equipping these electrolytic pots with an effluent collection device. This device covers the electrolytic pots and comprises a hooding device and a system for the suction and chemical treatment of the effluents. Known processes for treating effluents include, in particular, the recovery of fluoride gases by reaction with alumina. The hooding device includes access devices such as hoods and a tapping door which allow intervention into the pot. The tapping door, which is generally located at one of the ends of the pot on the traffic aisle side, allows a portion of the liquid aluminum produced during electrolysis to be extracted easily.

The hooding device defines a confined suction zone subjected to a vacuum relative to the environment, which allows the effluents to be effectively recovered. Gas collection yields as high as 99% are obtained during continuous running in the latest industrial installations, such that the rates of emission of fluoride gaseous compounds into the atmosphere are much lower than the statutory thresholds.

However, pollution regulations are constantly changing and the standards in force are becoming stricter. In particular, in some aluminum producing countries, the emissions of fluoride compounds, which are at present usually limited to less than 1 kg F (total fluorine) per tonne of aluminum produced (F/tonne Al), are likely to be limited to less than 0.5 kg F/tonne Al in the near future. There is therefore a need for a way of further reducing the atmospheric emissions from factories which produce aluminum by igneous electrolysis in order, in particular, to comply with the strictest standards, but which are satisfactory with regard to production costs.

Known processes for the production of aluminum by igneous electrolysis, which essentially run continuously, involve regular intervention in the electrolytic pots, which makes it necessary to open the hooding device, thus breaking the confinement of the suction zone. This is the case, in particular, during operations for changing spent anodes. The operations for changing spent anodes involve opening removable hoods to provide access to the anodes to be changed, and removing these anodes from the electrolytic pots and therefore from the suction zone of the hooding device of these pots. The crust is thus removed from the pots during changes of anodes either by being carried off by the spent anodes removed from the pots or by being intentionally removed so as to facilitate the positioning of the replacement anodes, among other things. The anodes and the bath crust removed from the pots in this way are very hot, i.e., at a temperature generally higher than 800° C., and consequently have to undergo a cooling phase to ambient temperature. In general, the anodes and the bath crust are then treated so as to recover the constituent materials, usually when they have reached a temperature close to ambient temperature.

The spent anodes and the bath crust removed from the electrolytic pots during changes of anode evolve significant quantities of gaseous compounds during their cooling phase. These gaseous compounds consist mainly of fluoride compounds. The rate of evolution of gaseous compounds is initially very high and then decreases rapidly in the hour following removal from the electrolytic pots, in particular due to the reduction in the temperature. The rates of evolution of fluoride compounds are typically of the order of 10 to 100 g of F per minute, only in the case of the spent anodes.

Consequently, although the suction devices are generally designed such that the opening of the hoods barely affects the effectiveness of suction during the operations of changing spent anodes, the removal of the anodes and of the crust from the suction zone leads to the direct emission into the atmosphere of the toxic gaseous compounds, in particular fluoride compounds, evolved by them during the handling and cooling thereof.

There is therefore a need for significantly reducing the quantity of gaseous compounds liberated directly into the environment by the spent anodes and the bath crust removed from the electrolytic pot during the operations of changing spent anodes and during the cooling of said anodes and crust. However, few means are known for satisfactorily achieving these objectives, in particular with regard to investment costs and process control and, more particularly, with regard to the limit of 0.5 kg F/tonne Al for emission of fluoride compounds.

It has recently been proposed in German application DE 42 21 882 Al to place the spent anodes in a transport and intermediate storage device. This device consists of a container possessing one or more compartments equipped with sealed hoods and in which the spent anodes are deposited. After closure of the hoods, the internal pressure in the container is raised due to heating of the internal atmosphere and accumulation of the gases evolved by the spent anodes. The gases are discharged into the environment by passing through filters which trap the toxic gases. However, this solution necessitates an adequate seal for the container which is at excess pressure relative to the ambient pressure, involving an increase in the production costs. Furthermore, the size of the filters and therefore their effectiveness is limited by the dimensions of the container and by the excess pressures permitted in the container.

SUMMARY OF THE INVENTION

It is an object of the invention to provide a process for changing spent anodes of pots for the production of aluminum by igneous electrolysis which allows the recovery of the gaseous compounds evolved by the spent anodes and by the crust removed from the electrolytic bath, in particular during the operations of changing the anodes and during the cooling of the anodes and the crust, with significantly reduced atmospheric emissions of said gaseous compounds. so as to obtain, in particular, atmospheric emissions of fluoride compounds well below 0.5 kg F/tonne Al and which is compatible with existing processes and devices for producing aluminum by igneous electrolysis.

It is a further object of the invention to provide a process for changing spent anodes of pots for the production of aluminum by igneous electrolysis which allows the recovery of the gaseous compounds evolved by the spent anodes and by the crust removed from the electrolytic bath, in particular during the operations of changing the anodes and during the cooling of the anodes and the crust, with atmospheric emissions of fluoride compounds reduced to well below 0.5 kg F/tonne Al, so that the process is compatible with existing processes and devices for producing aluminum by igneous electrolysis.

It is a further object of the invention to provide a process for changing spent anodes of pots for the production of aluminum by igneous electrolysis which allows the recovery of the gaseous compounds evolved by the spent anodes and by the crust removed from the electrolytic bath, in particular during the operations of changing the anodes and during the cooling of the anodes and the crust, which is compatible with existing processes and devices for producing aluminum by igneous electrolysis.

It is yet a further object of the invention to provide a gaseous effluent-collection device which allows the process according to the invention to be carried out effectively and under conditions compatible with known processes for producing aluminum by igneous electrolysis.

It has been discovered that the quantities of fluoride compounds liberated during changes of anodes and during the cooling of the anodes and the crust constitute a significant proportion of the atmospheric emissions observed in plants for the production of aluminum by igneous electrolysis, even though they do not exceed present standards. Therefore, the present invention exploits the knowledge that a reduction in these emissions will allow a significant reduction in the total quantity of fluoride compounds evolved per tonne of aluminum produced, also known as "total specific emissions of fluorides" and designated hereinafter merely by the term "specific emissions". In fact, as demonstrated by the comparative tests described hereinafter, factory control measures result in a significant increase in the gaseous emissions during the anode changing operations.

The present invention is also based on the observation that, despite an initially high rate of evolution, the majority of the total quantity of gaseous products evolved by the spent anodes and bath crust was in fact liberated after the anode changing operations and, more particularly, during the cooling phase.

Finally, by modifying the hooding device of the electrolytic pots, it is surprisingly possible to carry out the cooling phase under satisfactory conditions while simultaneously allowing the recovery of a large proportion, or even the majority, of the gaseous compounds evolved by the anodes and without significantly disturbing the production of aluminum.

It has thus been found that, under certain conditions, it is possible to carry out the anode-changing operations as well as the phase of cooling the anodes and the crust such that the majority of the gaseous compounds evolved by the anodes and the bath crust can be recovered without causing significant disturbance either in the course of the main anode-changing operations or in the production of aluminum. The anode-changing process can even be such that the emissions observed during the changes of anode deviate only slightly from the emissions observed during continuous running, i.e., during the periods between the anode-changing operations, during which periods the hooding device is normally completely closed.

In the process for changing spent anodes of electrolytic pots according to the invention, a large proportion, and preferably the majority, of the gaseous fluoride compounds evolved by the spent anodes and by the bath crust removed from the electrolytic pots during the cooling phase is recovered using an effluent-collection device for the electrolytic pots, such that the relative portion of the specific emissions attributable to the anode-changing operations is significantly reduced. Said majority is preferably at least equal to 50% and more preferably at least equal to 70%.

In the preferred embodiment, the process according to the invention involves the storage, during the cooling period, of the spent anodes or the bath crust or of said anodes and crust simultaneously in the effluent-collection device of the electrolytic pots, so as to allow the recovery, by means of the effluent-collection device of the pots, of a large proportion, and preferably the majority, of the gaseous compounds evolved during the cooling phase.

The gaseous effluent-collection device of the electrolytic pots according to the invention comprises a hooding device for pots for the production of aluminum by igneous electrolysis, suction means and effluent treatment means. It allows the temporary storage of spent anodes and bath crust such that the gaseous compounds evolved by the spent anodes and/or by the bath crust are effectively recovered by said suction means and are treated by said treatment means during the cooling and degassing of the spent anodes and/or crust.

The gaseous effluent-collection device according to the invention preferably also comprises a storage zone having access means. It allows temporary storage of spent anodes and bath crust and can be made to communicate with said suction means using coupling means such that the gaseous compounds evolved by the spent anodes and/or by the bath crust are effectively recovered by said suction means and treated using said treatment means during the cooling and degassing of the spent anodes and/or crust.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
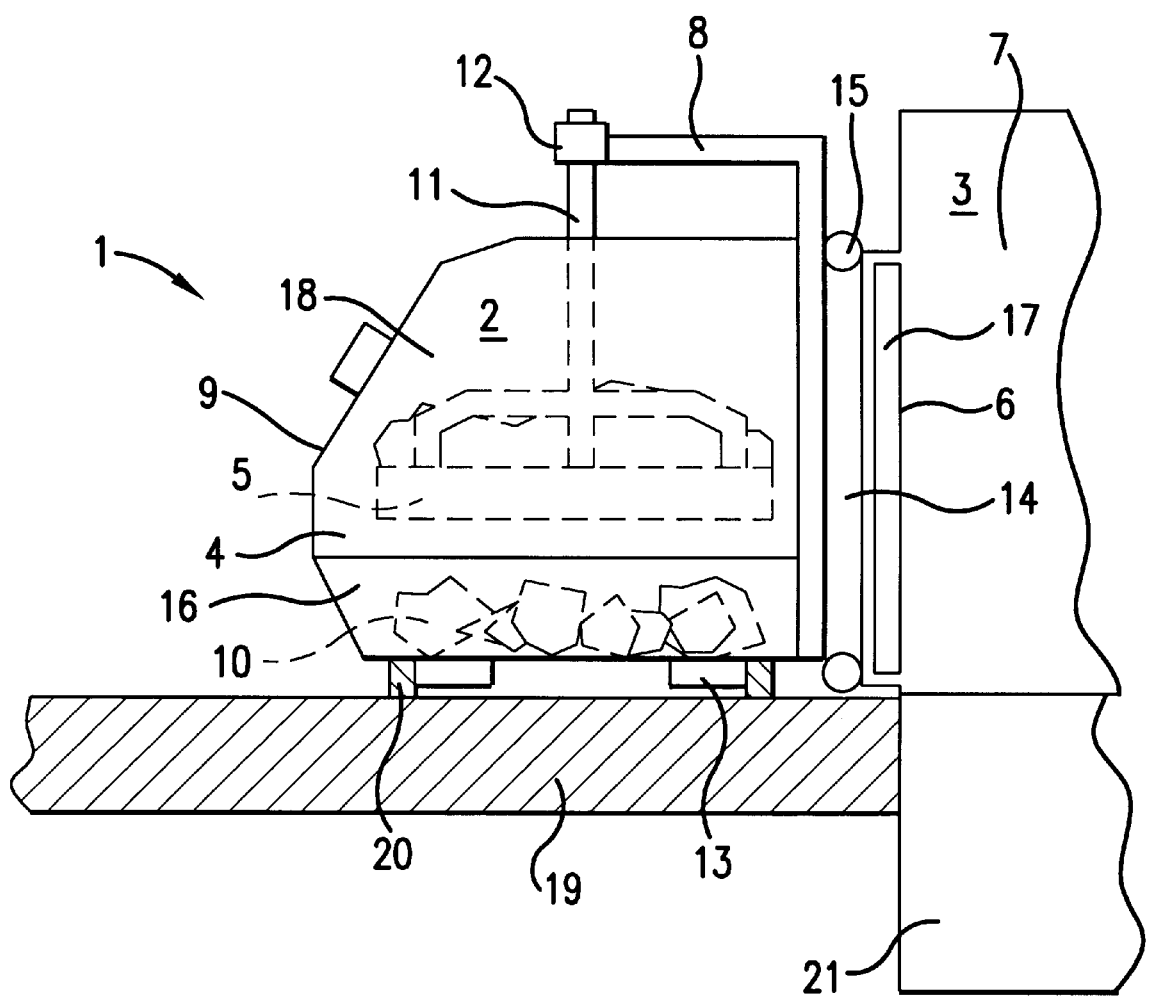
FIG. 1 is a schematic side view of a preferred embodiment of the gas collection device according to the invention which comprises a degassing and cooling container, a hooding device and means for the suction and treatment of the gaseous effluents.

In the preferred embodiment, the anode-changing process according to the invention, in addition to the main known anode-changing operations which include, in particular, the operations of removing spent anodes and portions of bath crust from the electrolytic pots, involves the temporary storage, during the cooling phase, of said anodes and/or crust in the effluent collection device of one or more electrolytic pot(s), preferably in a particular zone of said collection device known as storage zone. It is advantageous to be able to isolate said zone from the remainder of said collection device for certain operations of the process.

The anode-changing operations, in particular the operations involving the removal of spent anodes and portions of crust, the operations associated with storage and storage itself are effected so as to effectively recover the gaseous compounds evolved by said anodes and crust. Thus, the anodes and/or the crust are removed from their site of use and transferred into said storage zone in order to avoid the evolution of gaseous fluoride compounds outside the device. If the process involves the egression of the anodes and/or of the crust outside the collection device, such as removal and transfer into the storage zone in the majority of cases, the egression time should be sufficiently short not to reduce the effectiveness of the process. All the operations which precede storage and which lead to the egression of the spent anodes and bath crust outside the collection device are preferably carried out rapidly, generally in less than 10 minutes and preferably in less than 5 minutes.

The duration of temporary storage is advantageously such that the anodes and crust are not finally removed from the collection device until they have evolved the majority of the total quantity of gaseous compounds evolved by said anodes and crust during the cooling phase. The duration of temporary storage, which depends of several factors, can be determined either by tests, or by means of sensors such as temperature sensors allowing the temperature of the anodes and the crust to be determined.

According to an advantageous variation of the process of the invention, the spent anodes and the bath crust are temporarily stored in an auxiliary zone of the collection device known as the auxiliary suction zone which replaces the storage zone so as to minimize the disturbances in production of aluminum created by the anode-changing process. This auxiliary zone can preferably be isolated as desired from the remainder of the collection device, in particular so as to minimize the escape of gaseous compounds when carrying out the process according to the invention.

The changes of anode are preferably carried out successively on a series of electrolytic pots so the operations associated with the storage and cooling of spent anodes and bath crust can advantageously be combined. It is advantageous simultaneously to store spent anodes and bath crust in the same collection device. It is also advantageous, during a change of anodes on a given pot, to effect the storage and cooling of the spent anodes in a gas collection device different from that of the pot of which the anode is being changed, the bath crust withdrawn during the removal of these anodes being stored either in the same collection device or in a different device. In certain cases and depending on the industrial installations used, it may be advantageous to store several anodes simultaneously in the same storage or auxiliary suction zone.

According to variations of the invention, the auxiliary storage or suction zone can simultaneously contain several spent anodes or several pairs of spent anodes, typically one, two or three pairs of anodes. Said zone can advantageously contain one or more spent anodes and bath crust simultaneously. These variations allow the effectiveness of the changes of spent anodes in the electrolysis plant to be substantially increased and simplify organization.

The storage zone of the gas collection device according to the invention is advantageously located at one end of said gas collection device. Said storage zone preferably constitutes a suction zone auxiliary to said collection device which may be isolated from the suction means of the collection device. It advantageously includes one or more anode supports allowing anodes to be secured during the storage period.

According to an advantageous embodiment of the gaseous effluent-collection device according to the invention, said auxiliary suction zone comprises a degassing and cooling container preferably located at one of the ends of said hooding device, which can be made to communicate with said suction means using coupling means such that the gaseous compounds evolved by the spent anodes and/or by the bath crust are effectively recovered by said suction means and treated using said treatment means during the temporary storage of the spent anodes and/or crusts.

According to variations of the invention, the container can simultaneously contain several spent anodes or several pairs of spent anodes: typically one, two or three pairs of anodes. The container can advantageously simultaneously contain one or more spent anodes and bath crust.

The container comprises means of access such as one or more hoods which allow one or more spent anodes and/or crust to be introduced rapidly and easily therein, after the removal thereof from the electrolytic pots. The seal of these access means may be comparable to that of the normal means of access of the hooding device so special technology can be dispensed with. However, it is advantageous that the means of access allow one or more spent anodes and crust to be introduced into the same container, allowing implementation of the process according to the invention to be optimized. The container also preferably has one or more anode supports allowing the anodes to be secured during the cooling and degassing period.

Known hooding devices generally comprise an access route known as a tapping door which allows, in particular, liquid metal to be extracted from the pot. Said means for coupling the gas collection device according to the invention preferably include a coupling to said tapping door.

With reference to FIG. 1, which illustrates a preferred embodiment of the invention, the collection device 1, as viewed from the side, comprises a degassing and cooling container 2, a hooding device 3 and means for the suction and treatment of the gaseous effluents, not shown. The container 2 comprises a box 4 equipped with access means such as hoods 9 which may be removable or pivotable, and means for coupling the interior of the cooling container 2 to the hooding device 3, in particular an orifice 14 on the rear part of the box 4.

The container 2 preferably has one or more anode supports 8 equipped with fixing means 12 secured to the electrical connecting stem 11 of the spent anodes 5, thereby holding the electrodes in a determined position during the cooling and degassing period, allowing, in particular, more effective degassing of the spent anodes. The anode or anodes are advantageously positioned so that bath crust 10 and spent anodes 5 can be placed in the container 2 at the same time, the crust 10 preferably being deposited in a bucket 16 located at the bottom of the box 4.

The anode supports 8 as well as the fixing means 12 have to be adapted to the anode system of the pot, which varies from one plant to another. Depending on the individual case, they can handle, for example, one or more anodes equipped with a single stem each or one or more pairs of anodes equipped with a single stem each or one or more pairs of anodes equipped with a single stem per pair of anodes to be supported and secured.

The container 2 is preferably attached to the end of the hooding device 3 where there is an access route formed by a tapping door 6. The coupling means preferably include a coupling to the tapping door 6 of the effluent-collection device. Seals 15 are advantageously added in line with the joint between the container 2 and the tapping door 6 to ensure that the joint between the rear orifice 14 of the container and the tapping door 6 is sealed and reduce the head loss of the suction device. The tapping door 6 allows the internal volume 18 of the container to communicate with the suction zone 7 of the hooding device 3 when the flap or flaps 17 of the tapping door 6 is or are opened.

The coupling means optionally comprise a flexible or rigid suction tube which allows additional pumping on the container, in particular before opening of the tapping door or displacements of the container.

The coupling means are dimensioned so as to allow satisfactory suction within the container. Said means of suction and coupling to the container preferably allow an adequate suction rate to maintain a satisfactory vacuum between the environment and the interior of the container, that is about 250 Pa.

The container 2 is advantageously removable and transportable so as to allow, in particular, easy transportation of the spent anodes and/or the crust at the end of the cooling and degassing period. The container 2 also advantageously comprises handling means such as fork guides 13 allowing it to be loaded on transport means, or gripping or fastening devices (not shown) allowing the container to be raised, displaced and transported so as to facilitate handling and positioning thereof.

The container also preferably comprises insulated supports 20 allowing the container to rest on the traffic aisle 19 while ensuring satisfactory electrical insulation between the container and the aisle so as to avoid, in particular, the risk of electrocution.

The container is arranged, and optionally insulated from the pot 21, such that the cooling of the spent anodes is not affected by the heat of the electrolytic pots.

Comparative Tests

Comparative tests have been carried out on a series of 300 kA electrolytic pots to enable the invention to be compared with the state of the art. During these tests, a pair of anodes was changed successively on 30 adjacent pots in a row. The quantity of fluoride compounds evolved during continuous running and during these operations was determined from measurements taken using permanent detectors in the plant located in the region of the roof vent of the electrolysis room.

In a first series of tests, the spent anodes were removed and replaced using conventional methods, and no particular precautions were taken to limit the evolution of gaseous compounds by the spent anodes and the bath crust withdrawn from the suction zone of the electrolytic pots.

In a second series of tests, the anodes were changed according to the invention.

For these tests, 30 removable 5 $m^3$ steel containers with a structure similar to that of the container illustrated in FIG. 1 were produced. These containers comprised, in particular, two removable access hoods and an anode support allowing two anodes to be secured simultaneously. The periphery of the joint between the container and the tapping door was equipped with a tubular seal made of reinforced rubber. The containers according to the invention were placed at one end of the electrolytic pots and the coupling to the hooding devices of the electrolytic pots was produced by opening the flaps of the tapping doors, the hoods being closed until anodes and crust were deposited in the containers.

During these tests, the anodes were also removed and replaced using normal procedures, then deposited rapidly in the containers with the bath crust. The total time for transferring the anodes and the crust between the pots and the containers was always much shorter than 10 minutes, usually shorter than 5 minutes. The hoods were opened just before storage of the anodes and the crust, then closed again immediately after these operations and kept closed until completion of the cooling and degassing of the spent anodes and crust.

Figure 2:
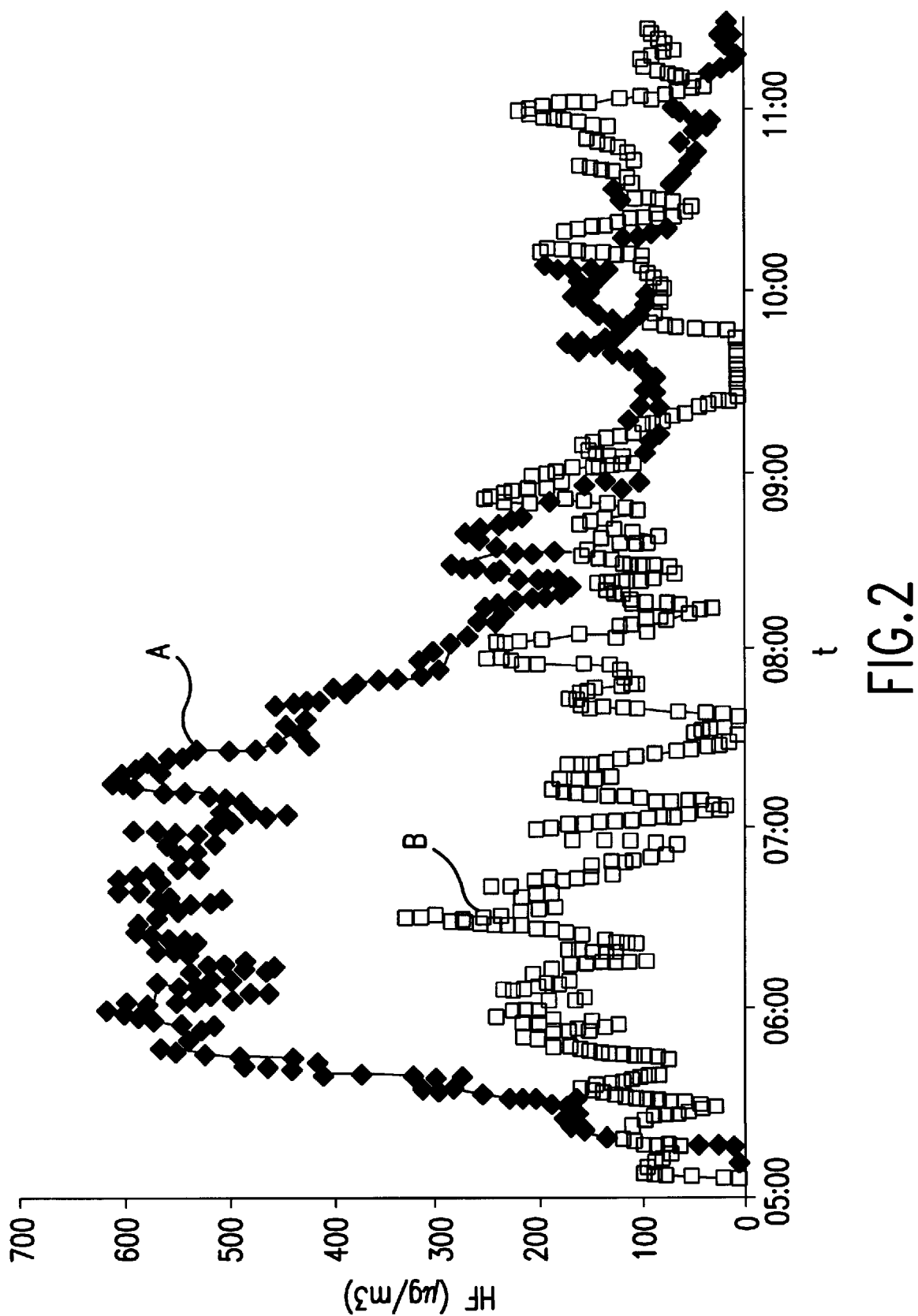
FIG. 2 shows an example of measurement of the gaseous fluoride emissions known as HF, as a function of the time in hours, carried out during the comparative tests described hereinafter, in which the curve A corresponds to typical values obtained when the changes of anodes are carried out according to the prior art, and the curve B corresponds to values measured when the changes of anode are carried out according to the invention.

The same measurements taken during the tests allowed the quantity of fluoride gas which would have been emitted into the atmosphere during the transfer operation and, by deduction, that recovered by the gas collection device to be evaluated. The total quantity of fluoride compounds emitted into the atmosphere as a function of time is illustrated in FIG. 2, in which line A represents the measured results using the conventional method and line B represents the results using the method according to the invention. These measurements demonstrated that the invention allows the level of fluoride evolution, expressed as specific values, to be brought from its normal value, that is about 0.5 kg F/tonne Al, to a much lower value, that is about 0.3 kg F/tonne Al, in other words an overall reduction of 0.2 kg F/tonne Al.

Although these tests were carried out on series of 300 kA electrolytic pots, the invention is applicable to series of pots of any intensity.

The invention allows recycling of the fluorine evolved in the known treatment means of installations for producing aluminum by electrolysis of aluminum, in particular by reaction with alumina powders intended for the electrolysis process, and is applicable to industrial installations of all sizes.

The device according to the invention has the advantage of easy automation of certain operations for changing spent anodes. In particular, in the preferred embodiment, the invention is advantageous due to the fact that the container is attached to the hooding device and, consequently, within the range of anode handling means inherent in known industrial installations for the electrolysis of aluminum. It also has the advantage of easy adaptation of existing gas collection devices which requires only a limited investment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for changing spent anodes of pots for the production of aluminum by igneous electrolysis, said pots being equipped with a gaseous effluent-collection device of a pot, said process comprising the steps of:

removing spent anodes and bath crust from the pots;

temporarily storing the spent anodes and bath crust in effluent-collection device; and permitting the spent anodes and bath crust to cool in the effluent-collection device, so that a large proportion of the gaseous compounds liberated by the spent anodes and bath crust is recovered.

2. A process according to claim 1, including the step of removing the cooled spent anodes and bath crust from the effluent-collection device of the electrolytic pots.

3. A process according to claim 2, wherein the anode removing step is carried out successively in a series of electrolytic pots, and wherein the storage and cooling steps for spent anodes taken from plural ones of the pots are combined.

4. A process according to claim 2, wherein said temporary storage step is carried out in an effluent collection device which is not associated with the pot from which the anode has been removed.

5. A process according to claim 1, wherein said temporary storage step is carried out in a storage zone of said gas collection device.

6. A process according to claim 5, wherein said storage zone is isolated from a remainder of said effluent collection device for certain operations in said process.

7. A process according to claim 5, wherein said temporary storage step is initiated within 10 minutes of said removing step.

8. A gaseous effluent-collection device for pots utilized in the production of aluminum by igneous electrolysis, comprising:

a hooding device configured to holding spent anodes and bath crust removed from the pots during a cooling phase of the spent anodes and bath crust;

suction means for sucking the gaseous effluents from said hooded device; and effluent treatment means for treating the sucked effluents, so that a large proportion of the effluents liberated by the spent anodes and bath crust removed from the electrolytic pots is recovered.

9. A collection device according to claim 8, wherein said hooding device includes a storage zone having access means and in fluid communication with said suction means such that the gaseous compounds evolved in said hooding device may be recovered.

10. A collection device according to claim 9, wherein said storage zone is located at one end of said hooding device.

11. A collection device according to claim 9, wherein said storage zone includes an auxiliary suction zone which can be insulated from said suction means.

12. A collection device according to claim 11, wherein said auxiliary suction zone comprises a degassing and cooling container having access means and is communicable with said suction means through a coupling means.

13. A device according to claim 12, wherein said container is positioned at one end of said gas collection device.

14. A device according to claim 12, wherein said access means allows plural spent anodes and crusts to be introduced into a single container.

15. A device according to claim 12, wherein said container comprises at least one anode support for securing the anodes therein.

16. A device according to claim 12, wherein said hooding device comprises a tapping door and wherein said coupling means includes a coupling to the tapping door.

17. A device according to claims 12, wherein the container is removable and transportable.

18. A device according to claim 12, wherein said coupling means comprises a suction tube.

19. A device according to claim 12, wherein said container has insulated supports allowing the container to rest on a traffic aisle while providing electrical insulation between the container and the aisle.

20. A device according to claim 12, wherein said container is thermally insulated from the pot such that the cooling of the spent anodes is not affected by the heat of the electrolytic pots.

21. A device according to claim 12, wherein said container is configured to simultaneously contain plural spent anodes.

22. A device according to claim 12, wherein said container is configured to simultaneously contain spent anodes and bath crust.

23. A device according to claim 12, wherein said container comprises handling means allowing said container to be displaced, transported and positioned.

24. A collection device according to claim 9, wherein said storage zone comprises at least one anode support for securing the anodes therein.

* * * * *

UNITED STATES PATENT AND TRADEMARK OFFICE
CERTIFICATE OF CORRECTION

PATENT NO. : 5,961,812

DATED : October 5, 1999

INVENTOR(S): GILBERT BOUZAT ET AL

It is certified that an error appears in the above-identified patent and that said Letters Patent is hereby corrected as shown below:

Column 8, line 66, delete "of";

Column 8, line 67, delete "a pot".

Column 9, line 3, before "effluent-collection" insert --an--;

Column 9, line 33, delete "holding" and insert --hold--.

Signed and Sealed this

Seventeenth Day of October, 2000

Attest:

Q. TODD DICKINSON

Attesting Officer       Director of Patents and Trademarks